United States Patent
Cordeiro et al.

(10) Patent No.: US 8,315,201 B2
(45) Date of Patent: Nov. 20, 2012

(54) CHANNEL SYNCHRONIZATION FOR WIRELESS SYSTEMS

(75) Inventors: Carlos Cordeiro, Portland, OR (US); Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1014 days.

(21) Appl. No.: 12/315,471

(22) Filed: Dec. 3, 2008

(65) Prior Publication Data

US 2009/0232126 A1 Sep. 17, 2009

Related U.S. Application Data

(60) Provisional application No. 61/035,480, filed on Mar. 11, 2008.

(51) Int. Cl.
*H04B 7/212* (2006.01)
(52) U.S. Cl. .......................... 370/324; 370/503
(58) Field of Classification Search .......... 370/337, 370/338, 336, 312; 455/435.2; 709/223
See application file for complete search history.

(56) References Cited

U.S. PATENT DOCUMENTS

| | | | |
|---|---|---|---|
| 7,447,503 B2* | 11/2008 | Shvodian | 455/435.2 |
| 2005/0243751 A1* | 11/2005 | Yoon et al. | 370/312 |
| 2007/0288618 A1* | 12/2007 | Yeo et al. | 709/223 |
| 2008/0002652 A1* | 1/2008 | Gupta et al. | 370/338 |
| 2009/0067389 A1* | 3/2009 | Lee et al. | 370/336 |
| 2009/0080389 A1* | 3/2009 | Messerges et al. | 370/338 |
| 2009/0103501 A1* | 4/2009 | Farrag et al. | 370/337 |

* cited by examiner

*Primary Examiner* — Andrew Lai
*Assistant Examiner* — Syed M Bokhari
(74) *Attorney, Agent, or Firm* — Schubert Law Group PLLC

(57) ABSTRACT

In some embodiments, a method for mitigating interference between wireless networks is disclosed. A network communications controller, such as a piconet controller that is new to an area, can monitor for and receive inter-network transmission from adjacent networks and the controller can monitor the received transmission and detect a synchronization parameter of the adjacent networks. The parameter can be an inter-network synchronization beacon that is transmitter on a narrowband channel. The controller can select an unoccupied narrowband channel to transmit inter-network synchronization information and the selected an unoccupied wideband channel to conduct intra-network transmissions. The wideband channel can be associated with the narrowband channel. Other embodiments are also disclosed.

19 Claims, 6 Drawing Sheets

CHANNEL SYNCHRONIZATION FOR WIRELESS SYSTEMS

CROSS-REFERENCE TO RELATED APPLICATIONS

This application claims priority to a provisional application No. 61/035,480 entitled 60 GHz WPAN MAC and PHY Features filed on Mar. 11, 2008. The contents of provisional application No. 61/035,480 are hereby incorporated by reference.

FIELD

The present disclosure relates to wireless networks. More specifically, the present disclosure relates to synchronization of a wireless network.

BACKGROUND

In a typical wireless network, many devices can communicate with each other. To facilitate communications between multiple networkable devices, communications must be managed. Thus, each network typically has a communications controller such as an access point, a piconet controller (PNC), or a station that acts as a controller to manage network communication. A PNC can be defined as a controller that shares a physical channel with one or more stations where the PNC and stations form a network. Each station, such as a personal computer, can associate with the controller and thereby associate with the network. Associating with the network can include connecting to the network. Getting authorized by the network and gaining access to resources that are available via the network connection. Stations and network controllers typically utilize a network interface card (NIC) to handle the association process and to facilitate communication between the network devices. To increase system efficiency, some wireless networks utilize omni-directional transmissions for the association process and directional transmissions for data exchange.

Many wireless networks utilize a frequency of 2.4 GHz for communicating, as defined by the Institute of Electrical and Electronics Engineers ((IEEE)) 802.11b and g specifications. Other wireless networks utilize a frequency of 5 GHz for communicating as defined by the IEEE 802.11a specification. IEEE 802.11a and b were published in 1999, and IEEE 802.11g was published in 2003. Due to the number of networks, and crowded airways in these frequency ranges, additional wireless networks standards are being defined where such networks can communicate utilizing millimeter waves producing frequencies of around 60 GHz. With such high frequencies, directional communications are being considered to achieve acceptable performance for the expected link budget requirements.

The Federal Communications Commission (FCC) limits the amount of power that a computer network type transmitter can emit. Both omni-directional transmissions and directional transmissions are anticipated for these networks that utilize millimeter wave transmissions. An omni-directional transmission generally provides a traditional radiation pattern where the signal energy evenly propagates (unless obstructed) in a spherical manner. In contrast a directional transmission can focus signal energy in a particular direction. A directional transmission can allow a network to operate more efficiently because more energy can be sent in the direction of a receiver while less energy is sent in directions where the signal is not intended to be received. Generally directional antennas have gains that are much higher than omni-directional antennas due to the narrower beam width, which focuses radio frequency power towards the receiving system. As stated above such a configuration does not waste nearly as much radio frequency (RF) power in directions where there are no receiving devices.

Likewise, a receiver can focus it's receive sensitivity in a particular direction. Thus, a transmitter can focus RF energy in a direction of a receiver and a receiver can focus receive sensitivity in a particular direction to mitigate interferences and increase communication efficiency. This is particularly important when such low power levels are utilized among many different types of interference. A directional transmission system can provide improved performance over omni-directional systems due to the increased signal strengths between devices and decreased interference from devices transmitting from directions where the receiver is less sensitive.

Thus, the omni-directional mode utilizes a relatively low data rate transmission on the order of a few Megabits per second to compensate for the loss of antenna gain. However higher data rates, on the order of a few Gigabits per second, are possible in a directional transmission mode since the directional link employs directional antennas and benefits from higher antenna gains. However, these directional systems are typically more complex and more expensive than traditional omni-directional transmission systems.

In addition to the omni-mode and directional-mode, network devices can also transmit in a wideband mode and in a narrowband mode. Thus, communication channel management can be based on the concept of narrowband and wideband channels where wideband channels can include more than one narrowband channel.

Since device locations (or relative locations of devices) in a piconet are not known on start up, the piconet can be formed utilizing a single narrowband channel. Accordingly, this single narrowband channel can be utilized for communication management. Communication management can include beaconing, device discovery, probes, association requests and acknowledgements, and other control/management messages. According to current and proposed specifications, these network management control transmissions are performed in the single narrowband omni directional communication format as described above. Once a device is associated with a network, the device can exclusively occupy a wideband channel and utilize high data rate, beamformed directional data communications.

This type of channelization can cause major problems when piconets are transmitting in different narrowband channels in the same wideband channel. When this occurs, omni mode transmissions in the narrowband channel can cause significant interference with data transfers between devices taking place in the directional mode in a wideband channel. Thus, such interference occurs even if such communication is done after beamforming.

BRIEF DESCRIPTION OF THE DRAWINGS

Aspects of the disclosure will become apparent upon reading the following detailed description and upon reference to the accompanying drawings in which like references may indicate similar elements.

DETAILED DESCRIPTION OF EMBODIMENTS

Figure 1:
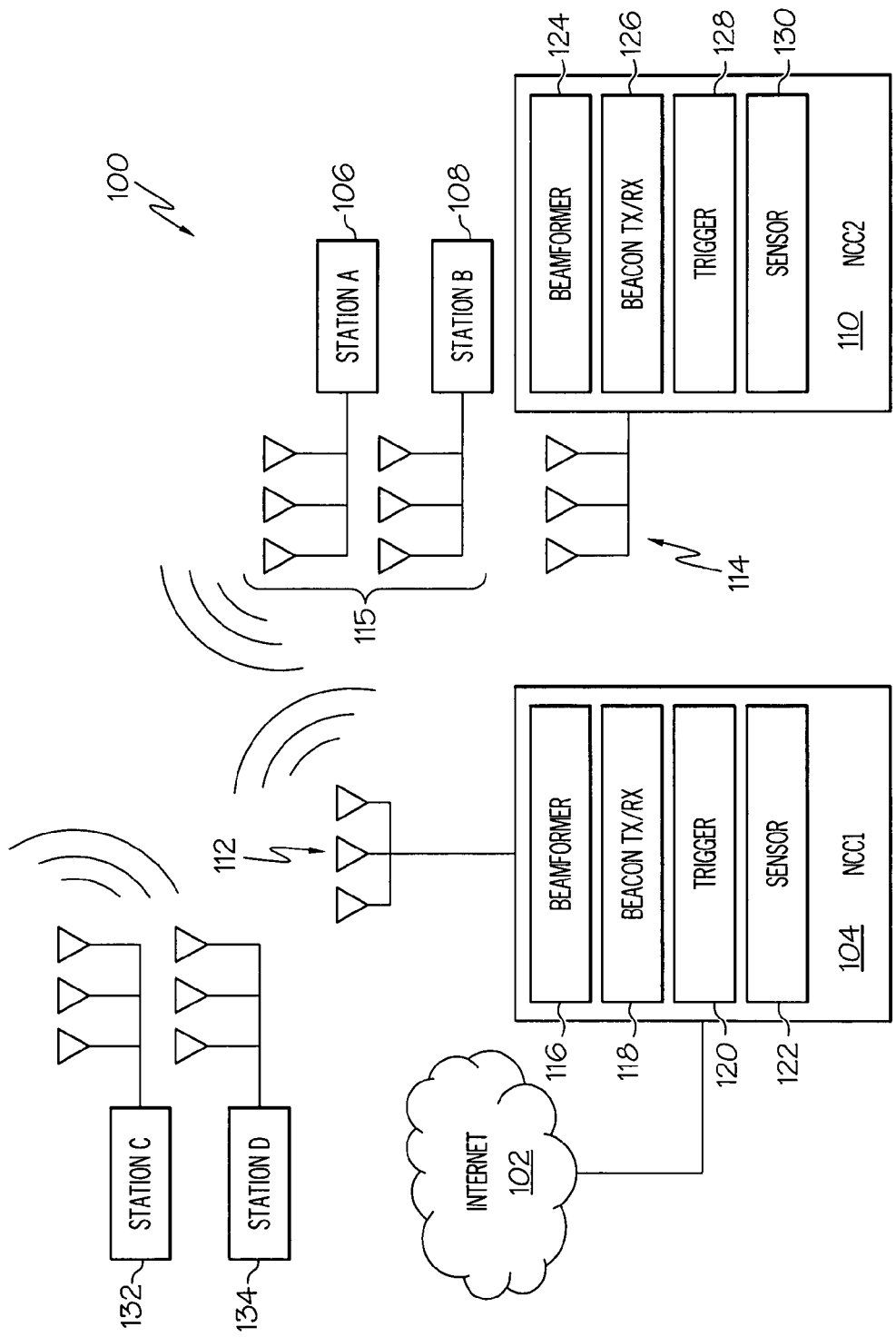
FIG. 1 is a block diagram of a network that can perform channel synchronization.

The following is a detailed description of embodiments depicted in the accompanying drawings. Arrangements in the form of systems, apparatuses, methods and computer readable media are disclosed herein that can provide efficient communication between a network communication controller (NCC) and stations in a wireless network. Such communications are referred to herein as intra-network communications. Intra-network communications can include beacon transmissions and data transmissions. In addition, arrangements in the form of systems, apparatuses, methods and computer readable media are disclosed herein that can provide efficient communication between multiple NCCs in range of each and such communications can manage and/or synchronize channel usage among different networks. Such management, synchronization and communications are referred to as inter-network management, synchronization, and communications. These communications generally only include beacon transmissions as typically no data (other than synchronization data) is transmitted among networks. Such internetwork activities can create a synchronized area or synchronized domain. In some embodiments, the NCC can be a piconet controller, an access point, a station or any device that can provide management commands to control intra or inter-network communications.

A single NCC can create a wireless local network (WLAN), a wireless personal area networks (WPAN)s, or generically, just a wireless network (WN) as utilized herein. It is anticipated that WN's might be located in close proximity to each other. When one WN is located proximate to another WN, communications among the first WN can significantly interfere with communications among the second WN. Some embodiments disclosed herein provide synchronization of communications between adjacent networks such that adjacent networks utilized different channels thereby reducing interference.

As implied above, severe communication degradation can result in a wireless network when high-rate directional communications are taking place on the wideband channel where a narrowband within the wideband is being utilized by an adjacent WN. In environments such as offices, office buildings, airports, etc., where multiple WNs are operating or transmitting, interruptions to communications can become a significant problem.

In accordance with this disclosure, communications from different WNs are managed or synchronized utilizing a special beacon signal from each NCC. An NCC that is a new arrival to an adjacent network can detect other networks and, based on such a detection, the newly arrived NCC can choose a band of frequencies that are not allocated or in use by a network in proximity to the newly arrived NCC.

The disclosed arrangements provide a hierarchy based on the detection of other networks and an arrival time of the subject NCC, where the subject NCC will transmit a special beacon in a unused time slot based on a detection of other special beacons (if any). The special beacon time slot selection can depend on how many NCC special beacons are received by a NCC. Thus, the NCC can determine where an open time slot for transmitting a special beacon exists and self allocate the time slot for its special beacon transmission. The detection of an empty time slot and the allocation of a time slot to an NCC can dictate which channel is assigned to a particular NCC. Such a procedure can be referred to as channel synchronization or channelization.

Referring to FIG. 1, a basic configuration of more than one WN is illustrated as a wireless multi-network system WMNS 100. The WMNS 100 can include NCC 1 104, NCC 2 110, station A 106, station B 108, station C 132 and station D 134. Each station can have a directional antenna system illustrated by antenna array 112, and 115. The NCC's 104 and 110 can include a beamformer 116 and 124, a beacon receiver transmitter 118 and 126, a trigger 120 and 128 and a sensor modules 122 and 130.

The WMNS 100 could be a WLAN or a WPAN that complies with one or more of the IEEE 802 set of standards. NCC 1 104 can be connected to one or more networks such as the Internet 102 and possibly NCC 2 110. In some embodiments, NCC 1 104 and NCC 2 110 could be piconet controllers (PNC)s. A piconet may be defined as a collection of stations with a controller occupying a shared physical channel. In some embodiments a station such as a personal computer can be set up as NCCs 104 and 110 and the remaining stations can then "connect" to a WN via control functions or communication management functions provided by the NCCs 104 and 110. Each NCC 104 and 110 can provide centralized synchronization for their respective network communications and such management can also include management of quality of service (QoS), power saving modes, and access to the network for other devices to name a few.

In some embodiments, the disclosed WMNS 100 can support most wireless technologies including wireless handsets such as cellular devices, or hand held computing devices that utilize WLAN, WMAN, WPAN, WiMAX, handheld digital video broadcast systems (DVB-H), Bluetooth, ultra wide band (UWB), UWB Forum, Wibree, WiMedia Alliance, WirelessHD, Wireless uniform serial bus (USB), Sun Microsystems Small Programmable Object Technology or SUN SPOT and ZigBee technologies. The WMNS 100 can also be compatible with single antenna, sector antennas and/or multiple antenna systems such as multiple input multiple output systems (MIMO).

NCC's 104 and 110 can include antenna arrays such as array 112 and 114 to facilitate directional communications. NCC 2 110 can facilitate communications between itself and networkable stations or network devices such as station A 106 and station B 108, while NCC 1 104 can facilitate communications between itself and station C 132 and station D 132. It can be assumed that the NCCs 104 and 110 are located in proximity to each other such that NCC's 104 and 110 can detect each other's transmissions. It can also be assumed that NCC's 104 and 110 can transmit and receive communication management controls and data in segments commonly referred to as frames or superframes.

Thus, NCCs 104 and 110 can utilize management frames to manage connections (i.e. associations and re-associations) disconnections (dis-associations) and to allocate channels for each NCC such that multiple NCCs do not utilize the same channels to transmit data. Such a management configuration can greatly reduce interference caused by an adjacent or proximate network particularly during a data transfer process that is conducted after the communication management and control frames set up the data transfer process.

Utilizing narrowband channels to set up a WN has many advantages such as improved interference rejection. However, one problem with sharing a wideband channel is that nearly all transmissions in the narrowband channel are performed utilizing an omni-directional transmission. Such a transmission can interfere with directional transmissions conveying data over a wideband channel. Such interference can occur even if this wideband communication is taking place in a directional mode.

Accordingly, different WNs, such as the WNs controlled by NCC 1 104 and the WN controlled by NCC 2 110, can operate in different narrowband channels and such narrowband channels can fall within a wideband channel that is in use by another WN. Such a lack of channelization or channel synchronization often causes interference that ultimately causes an interruption in communication between an NCC and a station.

Such interference and link interruptions are further complicated when the number of narrowband channels (N) that are active is greater than two (2). Accordingly, interference in wideband communications can occur in different segments of the frequency spectrum where the wideband communications originate from different WNs when the WNs are utilizing different narrowband channels. It can be appreciated that the operation of neighboring WNs without some form of synchronization or channelization can cause significant problems for many WNs operating in congested airways.

In some embodiments, the number of narrowband channels per wideband channel can be equal to one (1) and equal to the bandwidth of the wideband channel. In this case, there is no physical difference between a narrowband channel and a wideband channel. The system and apparatus described in this disclosure also apply to this special case.

In accordance with the present disclosure, a multichannel synchronization arrangement is provided that overcomes at least the majority of interference caused by multiple transmitters from multiple WNs. Accordingly, a channel or communication synchronization beacon (CSB) can be transmitted by a beacon receiver transmitter (RX/TX) such as 118 and 126. Communication or channel management information contained in the beacon such as timing information transmitted by the NCCs 104 and 110 can allow NCCs 104 and 110 and other NCCs to utilize separate channels thereby reducing inter-network interference.

The CSB can also be thought of as a channel synchronization beacon or just an inter-network synchronization beacon. In some embodiments, the CSB can be integrated into the standard intra-network beacon or can be transmitted during the beacon period (BP) by a particular NCC. Such a configuration can be efficiently implemented when the narrowband transmission and the wideband transmission are on the same channel.

In some embodiments NCCs 104 and 110 that are operating in narrowband channels can transmit special beacons in time intervals that are non-overlapping. Such transmissions can be made in the time domain and can be communicated between WNs that are, operating in narrowband channels. In such a configuration, superframes can maintain synchronization across narrowband channels within the same wideband channel. Such synchronization can mitigate interference that is commonly generated in the wideband channel.

Thus, the disclosed arrangements provide a way to mitigate interference that occurs from multiple WNs operating on the same wideband channel. Interference can be mitigated by synchronizing or coordinating the sources of interference that exists amongst the WNs that share the same wideband channel. With channel synchronization, more than one WN can operate on the same channel, even when WNs operate on different narrowband channels. In operation, NCC 2 110 can receive a beacon from the NCC 1 104 when entering the area serviced by NCC 1 104. Receipt of the beacon can allow NCC 2 110 to become synchronized with NCC 1 104.

The standard beacon can act as a "heartbeat" of the WN, enabling stations A 106 and B 108 to establish and maintain network communications with NCC 2 110 or to enable stations C 132 and D 134 to establish and maintain network communications with NCC 1 104 in an orderly fashion. The authentication request is also a management frame that can be sent by a station, such as station C 132, to NCC 104. Yet another management frame association request can be made by station A 106 when station A 106 is attempting to join the WN controlled by NCC 2 110. In some embodiments, multiple time slots in a superframe can be allocated for the transmission of the CSBs. The time slots can occur within a specified time interval after the start of a superframe.

In multi-network operation, NCC 1 104 can power up in a specific area and can monitor the airways for and possibly receive a standard beacon. If a standard beacon can be received, NCC 1 104 can synchronize with the transmitting NCC. Once synchronized, the subject NCC can listen for a CSB in all CSB time slots. NCC 1 104 can also scan narrowband channels for an entire superframe. If NCC 1 104 does not detect at least one signal with predetermined parameters (i.e. a standard beacon, a CSB, and/or narrowband transmission, signal level, frequency, data etc.), NCC 1 104 can assume that there are no WNs or NCC's proximate to the NCC 1 104 and that all channels are useable.

When NCC 1 104 does not detect such a signal with the predetermined parameters, NCC 1 104 can transmit a standard beacon and then a CSB on a first available timeslot after the start of the superframe (i.e. the CSB time slot with an offset of one). The timeslot acquired by NCC 1 104 can dictate the narrowband of frequencies that is assigned to NCC 1 104 for use to create the network. In such a situation, NCC 1 104 can claim that it is a master NCC. The master NCC can still transmit a regular master beacon at the beginning of its superframe in addition to the CSB.

When the narrowband channel is the same as the wideband channel (i.e., the number of narrowband channels is equal to one), the master NCC does not need to transmit the CSB in addition to its standard beacon. The standard beacon can be used as means to achieve synchronization in addition to performing the typical functions of a standard beacon.

Acquisition of a CSB time slot can be utilized to provide synchronization with future neighboring NCCs. Accordingly, when a second NCC, such as NCC 2 110, enters the area and/or powers up, NCC 2 110 can detect the standard beacon and the CSB transmitted by NCC 1 104. In response to reception of the standard beacon, NCC 2 110 can time synchronize and, based on the CSB received from NCC 1 104, NCC2, 110 can channel synchronize. NCC 2 110 can take the next available or, in this case, the second CSB time slot. Based on acquisition of the second time slot, NCC 2 110 can acquire or be allocated a specific narrowband frequency that does not interfere with wideband transmissions from NCC 1 104. The standard beacon as specified for station to NCC association should not be confused with the CSB described herein. As briefly mentioned, the standard beacon can contain network timing synchronization and the CSB can contain channel synchronization.

Trigger modules 120 and 128 of NCC 1 104 and NCC 2 110 respectively, can trigger or activate the usage of a particular CSB time slot and channel based on management information and timing. For example, the trigger module 120 can start the beamforming process based on the detection of RF energy by the sensor 122 and trigger module 120 can also trigger CSB timeslot usage and channel usage based on standard beacon and CSB beacon information. Trigger module 120 can also provide a trigger signal that is delayed from the detection of a predetermined phenomenon.

In some embodiments, sensors 122 and sensor 130 can detect beacons, channels in use, the existence of radio wave or electromagnetic energy, the incoming direction or the direction of origin of the energy, data rates, the frequency band of the energy (i.e. wideband or narrowband, how wide, what frequencies), etc. Based on such detection, the sensors 122 and 130 can send one or more control signals to trigger modules 120 and 128.

Figure 2:
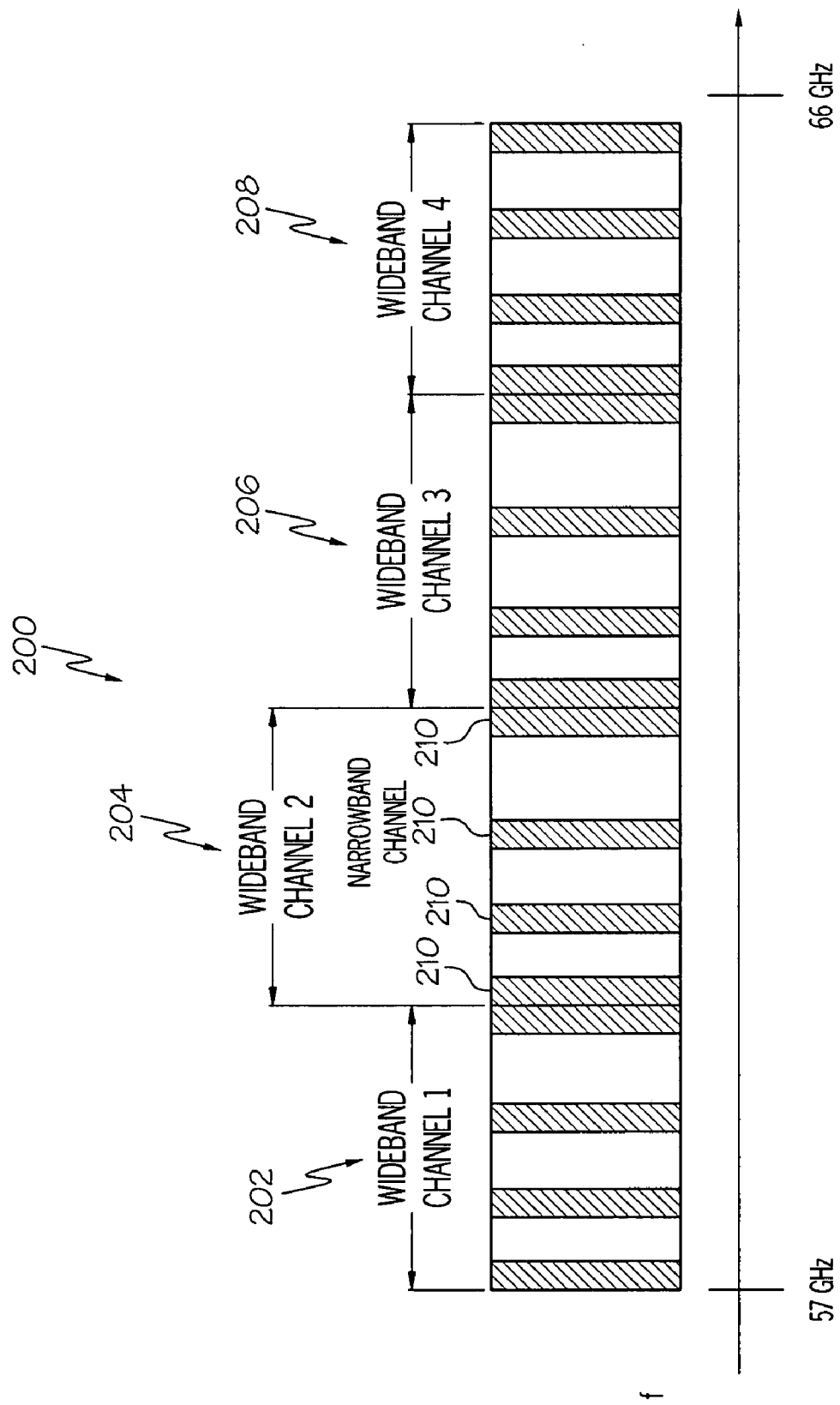
FIG. 2 is a bandwidth diagram depicting possible channels that can be utilized by wireless devices.

Referring to FIG. 2, a bandwidth diagram having a frequency range of 57 to 66 GHz is depicted. Four wideband channels such as wideband channel 1 202, wideband channel 2 204, wideband channel 3 206, and wideband channel 4 208, (referred to as wideband channels 202-208) could be allocated for a WN. As illustrated each wideband channel 202-208 could span three narrowband channels 210. A wideband channel can cover a group of frequencies or an allocation of frequencies and a narrowband channel can cover a group of frequencies. In some embodiments the wideband can cover a span of frequencies that is five to ten times greater in range or bandwidth than the narrowband. In some embodiments, a single active narrowband channel can reside within an active wideband channel. In such a configuration, the wideband and narrowband channels can share some frequencies. This configuration can lend itself to different methods of synchronization as will be described with reference to FIG. 4 below.

Although three narrowband channels per wideband channel are illustrated, such a configuration is utilized for simplifying the description herein and the number of wideband and narrowband channels should not be utilized to limit the scope of the teachings herein. The channel diagram illustrated has four wideband channels and three narrowband channels for each wideband channel. Is should be noted that the fourth, eighth and twelfth narrowband channels overlap adjacent wideband channels. The disclosed WN(s) can utilize a single narrowband channel to set up and maintain communications. Allocating narrowband channels to reduce interference can be referred to as channelization. The narrowband channels can be utilized for intra-network management communications. Such management communications can include beaconing, association requests, association confirmation, (dis) association, bandwidth reservation, channel allocation, etc.

As stated above, most traditional networks transmit communication management frames in an omni-directional mode over narrowband channels. However, when high-rate data communication is required, devices often perform beamforming and switch to a high data rate directional transmission mode that utilizes a wideband channel. Thus, problems can arise when one NCC utilizes wideband channel 2 204 to conduct high speed communication while three adjacent NCCs utilize narrowband channels 210 to conduct communications management. Such a configuration can cause communication failures for all NCCs.

Accordingly, low data rate omni-mode transmission from adjacent networks can cause significant interference with an NCC conducting high data rate directional transmissions. Significant interference will occur even though the NCC in the wideband communication mode has beamform and is communicating in a directional mode.

If adjacent networks can time synchronize, NCC's can share channels by multiplexing in a time domain. Accordingly, communication management frames can occur at a different time than the data transfer frames and thus, if adjacent networks are synchronized, the narrowband transmission can occur at times such that the narrowband transmissions do not interfere with the wideband transmissions. Alternatively stated, NCC's that are physically proximate to each other can time synchronize and can utilize overlapping frequencies or frequency bands without causing significant interference for each other.

It can be appreciated that the more narrowband channels that are occupied or in use in a wideband allocation, the greater the interference to the devices utilizing the wideband. As stated above, severe performance degradation can result from high-rate directional communications taking place on a wideband channel congested by multiple narrowband transmissions. Such congested airways are likely to occur in environments such office buildings, cubicles, libraries, airports, etc., where multiple WNs are operating.

In accordance with the present disclosure, a multichannel synchronization arrangement is provided that overcomes at least the majority of interference caused by multiple transmitters from multiple WNs in close proximity to one another. Accordingly, a channel or communication synchronization beacon (CSB) can be transmitted by NCCs and received by NCCs to facilitate time and channel synchronization between different networks. In some embodiments, the channel synchronization beacon can be utilized to prohibit WN proximate to other WNs from utilizing specific narrowband channels. Such a synchronization arrangement can be viewed as an attempt to keep narrowband transmissions made by one WN from interfering with wideband transmission from another WN.

It can be appreciated that time and channel synchronization between NCCs can greatly reduce interference for WNs. Further, NCC operating in narrowband channels can transmit CSBs in non-overlapping time intervals such that all NCC in range can detect other NCCs in the area. The CSB transmissions and other beacons can be made in accordance with predetermined time slots. In such a configuration, superframes can maintain synchronization across narrowband channels within the same wideband channel. Such synchronization can mitigate interference that is commonly generated within the wideband channel.

Synchronizing or coordinating sources of interference or interference due to sharing overlapping frequencies can greatly mitigate inter-network interference. Thus, it is a goal of the disclosed configuration the no more than one or two WNs operate on the same channel, and such a synchronization configuration can solve or mitigate interference problems.

Figure 3:
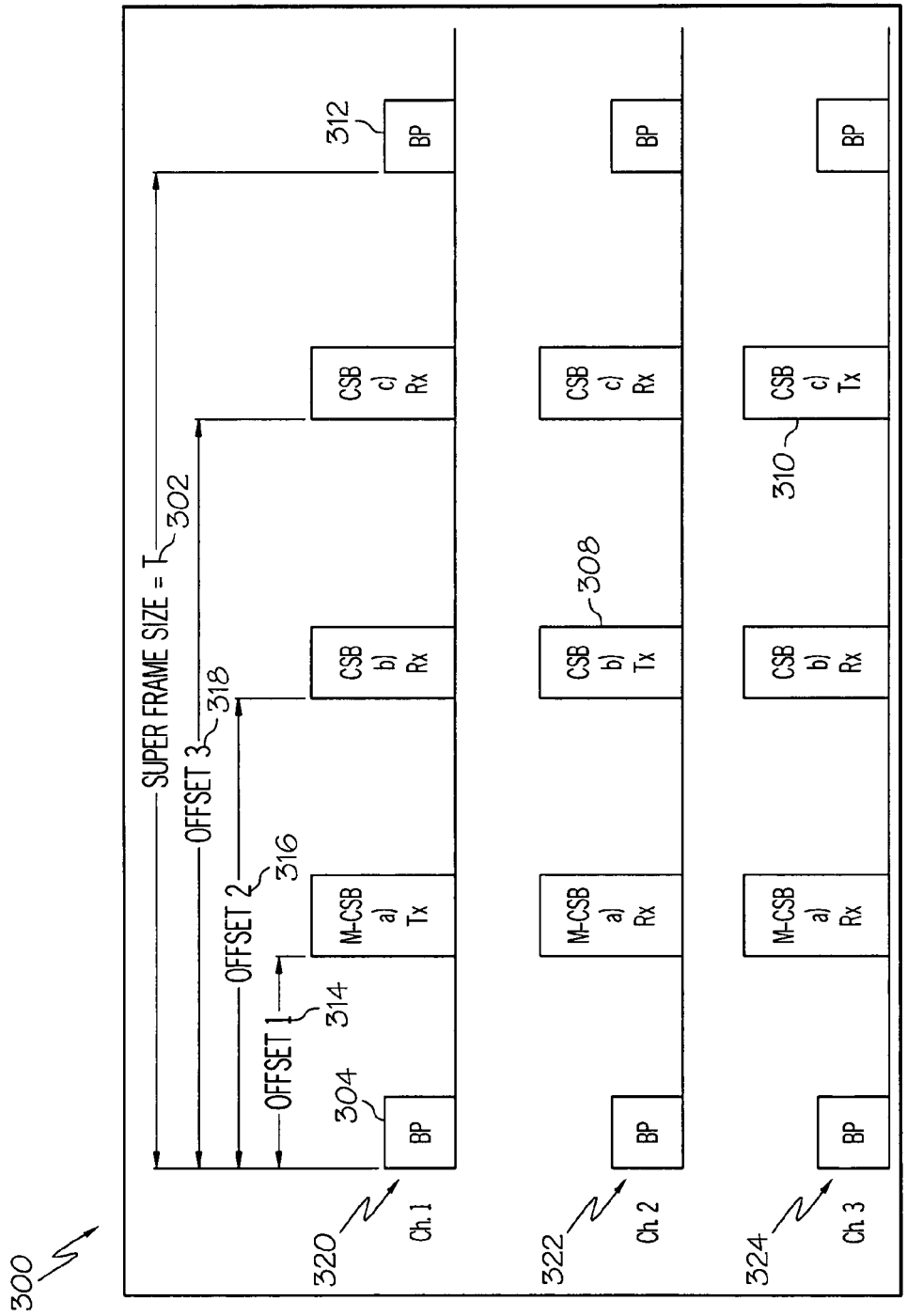
FIG. 3 is a timing diagram depicting a possible channel synchronization arrangement.
Figure 4:
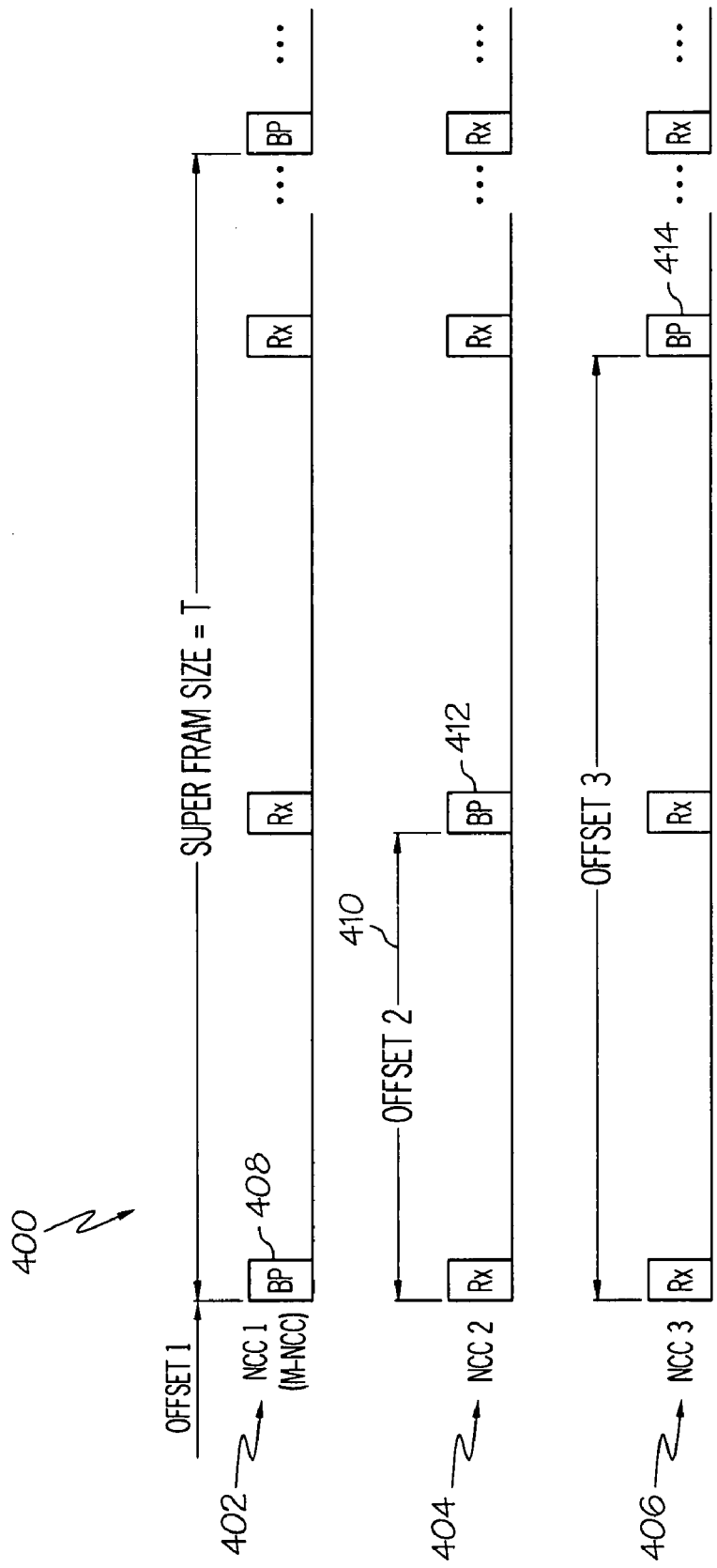
FIG. 4 is another timing diagram depicting another synchronization arrangement.

Referring to FIG. 3, a timing synchronization diagram that can manage three different communication channels in a channel synchronization region is illustrated. Although only three channels are illustrated, the teachings herein could synchronize fewer channels or synchronize many more channels. For example, FIG. 4 shows how the synchronization could operate utilizing a single channel. As stated above, as part of a start up procedure or a reconfiguring procedure, an NCC can monitor specific radio frequencies for the transmission of beacons. Such beacons can provide an NCC with a plethora of information regarding the identity of networks operating in the area and communication parameters such as timing of such networks.

Referring to channel one (1) 320, a traditional synchronization beacon (SB) 304 can occur at the beginning of every superframe, such as superframe 302 on each channel. In some embodiments, a specific narrowband channel can be associated with a specific wideband channel. Thus, if a NCC can acquire a specific time slot for beacon transmission it will automatically acquire a wideband channel for intra-network communications management and data transfer. The beacon can be an indicator that a specific wideband and narrowband is occupied in the synchronized area. Each NCC operating in a synchronized area can send a traditional beacon at the start of each superframe on a channel to which it assigned or which is has acquired. Thus, after the end of superframe 302, a subsequent synchronization beacon (SB) 312 can mark the start the next or subsequent superframe (not shown in its entirety). During superframe 302, on all channels (i.e. channel one 320, channel two 322 and channel three 324), CSBs can be transmitted to different NCC in different CSB time slots.

In some embodiments, during the start up process, an NCC can detect other NCCs in the area and each NCC can, based on a set of rules, determine an open time slot and begin transmitting its own CSB during this time slot. In some embodiments, the CSB can locate an open timeslot-channel combination to begin transmitting a CSB. The set of rules can provide that a first in time NCC can become a master channel synchronizer. The CSB time slots can have different magnitudes of timing offset such that many NCCs can receive the CSB during this time slot. Each NCC that joins the synchronized area thereafter, can take the next available time slot. As NCCs exit the synchronized area, NCCs that are operating in the synchronized area and are lower in the hierarchy than the exiting NCC can move up in the hierarchy to fill empty time slots.

In some embodiments, a NCC that looses power or desires to exit the synchronized area can transmit an exit message to alert other NCCs in the synchronized area of "a soon to be available" time slot. In some embodiments, when a NCC determines that the timeslot immediately preceding its time slot is unoccupied, the NCC can "move up" in the hierarchy and start transmitting its beacon utilizing this previously unoccupied time slot. For example, should the master NCC cease transmitting, the NCC that transmits a CSB directly after the master NCC can start transmitting in the master position. Thus, as NCCs drop from the disclosed synchronization timing arrangement all NCCs that are lower in the hierarchy can move up in position/rank. In some embodiments, other factors could be utilized to determine which NCC or NCCs become masters. For example, the NCC with the lowest or highest media access control (MAC) address could be selected as a new master NCC.

After determination of an open CSB time slot, an NCC can acquire a CSB time slot by transmitting a CSB during the open time slot. As illustrated, master NCC (M-NCC) can occupy channel 1 320 and M-NCC can be in a transmit mode and transmit CSB a 306 at time offset 1 314 and can switch to a receive mode for the remaining time slots CSB b 308 and CSB c 310. During CSB b 308 the NCC occupying CSB b 308 can transmit a CSB on channel two 322 while all NCCs in the synchronized area receive the CSB transmission on channel two 322. The same applies to CSB c on channel 3 324 where a third NCC transmits during the CSB c time slot while all other NCCs receive the CSB c 310 transmission.

The M-NCC can transmit during the CSB master or first CSB time slot, CSB a 306 on channel one 320. Another NCC such as the second NCC in the hierarchy can transmit CSB b 308 on channel two 322 in response to a second time offset 316, and a third NCC can transmit CSB c 310 on channel three 324 during a third time offset 318. Data contained in the CSB a 306 transmission can provide control and synchronization information to the other NCCs (i.e. non master NCCs) in the synchronized area.

As stated above, the M-NCC can be an NCC that powers up, monitors the airways and does not detect any indication of other NCCs in the area capable of channel synchronization. Thus, the M-NCC can acquire the first CSB time slot 306 having an offset of one 314. Also as stated above, the second NCC to power up, or enter the channel synchronization region can take the second CSB time slot, having an offset of two, and the third NCC to power up or enter the synchronization region can take the third tile slot. The NCCs can continually monitor beacons and when an NCC exits the network a NCC can move up in the hierarchy taking a new channel and a time slot with a lesser offset.

Thus, the CSB interval that is acquired by the NCC can dictate which channel the NCC can utilize to conduct communication management transmissions and possibly (and as illustrated) can dictate the channel that the NCC utilizes for data transfers between stations in the NCC's network. Thus, the M-NCC can transmit data to its stations on channel one 320, the second NCC can transmit data to stations in its network on channel two 322, the third NCC can transmit data to station in its network on channel three 324 and so on (only three channels are illustrated) until all NCCs in the synchronized area have transmitted their CSB and then the M-NCC can transmit again to start a new cycle. In other embodiments, the CSB time slot acquired by each NCC may be independent of the channel assigned to the NCC. For example, channel one 320 and channel two 322 may not be adjacent or even near in frequency allocation. Further the channels could be wideband channels, narrowband channels or a combination thereof.

In some embodiments, the set up, synchronization, channelization and control configuration disclosed can be utilized to coordinate only omni-mode transmissions for WNs that are located in relatively close proximity to each other. In some embodiments channel separation is utilized, in some embodiments time separation is utilized, and in other embodiments a combination thereof is utilized. In some embodiments the offsets can be pre-allocated in time such that their values are known in advance or their assigned time slot is specified or defined. In some embodiments, the time slots could be announced or specified as part of the beacon.

Such arrangements allow WNs to communicate control management frames in narrowband channels that do not overlap wideband channels that are in use by other NCCs. The disclosed multichannel synchronization arrangements can utilize the channel synchronization beacons to set up and/or allocate channel in an area that is congested with RF energy. It can be appreciated that the disclosed synchronization arrangements can ensure that interference from transmitting NCCs in close proximity to each other can be mitigated because time synchronized and channel synchronized transmissions can reduce interfering transmissions yet still allow at least portions of channels and frequencies to be shared.

In some embodiments, the CSB can carry enough information to allow a station to synchronize and perform clock and data recovery. For example, the information contained in the CSB can include timing and channel synchronization signals, a piconet coordinator identifier, or an NCC identifier, the master NCC identifier, clock information, timestamp information, or other communication management data. Such a synchronized configuration provides that CSBs from different NCCs utilizing different narrowband channels can be transmitted at different times.

In the disclosed time domain separation, channel separation is adaptive, flexible and scalable allowing for management of numerous NCCs with minimal overhead. For example, interference can be mitigated even when numerous NCCs and stations enter the synchronized area and exit the synchronized area. The disclosed arrangements can reduce channel and time conflicts and thus interference in spite of the transient nature of WNs.

It can be appreciated that only four wideband channels, three narrowband channels per wideband channel and three CSB slots have been utilized to describe some embodiments. However the scope of this disclosure is not limited by any of these parameters as many combinations of wideband channels, narrowband channels, bandwidths, timing configurations, etc. could be implemented in accordance with the teachings herein. For example, the CSB offsets and/or durations could be uniform or could be non-uniform in time. Thus, the selection of the number of narrowband channels, wideband channels, CSB timing allocations, CSB composition, etc., is a design issue, and should not be considered as limited to the described arrangements.

Referring to FIG. 4, a timing diagram 400 is depicted that provides another inter-network synchronization configuration. The timing diagram 400 illustrates a configuration where there is one active narrowband channel per active wideband channel. In some embodiments the narrowband channel can have the same bandwidth as the wideband channel. In such a case, the CSB described above can be integrated into the traditional intra-network beacon or the standard intra-network beacon such that the intra-network synchronization beacon and the inter-network synchronization are transmitted in a common time slot or time interval.

In some embodiments the distinction between wideband transmissions and narrowband transmissions may not be sharply defined in terms of frequencies or bandwidth utilized in such transmissions. Accordingly, in embodiments where the inter-network beacons, intra-network beacons and intra-network data transmissions utilize the same or similar bandwidths, synchronization transmission or beacons are designated as narrowband transmissions and data transmissions or intra-network data transfer transmissions are referred to as wideband transmissions."

Alternately explained if the bandwidth of the narrowband channel happens to be the same as the wideband channel or there is only one narrowband channel per wideband channel which occupies the entire wideband channel as illustrated in FIG. 2, then beacon transmissions (intra-network and inter-network) are referred to as narrowband transmissions. This designation applies even though what physically occurs is that narrowband and wideband transmissions will utilize the same bandwidth.

In some embodiments, no "special" time interval or time allocation is needed for the inter-network synchronization transmissions nor is there a need for a specialized CSB. Accordingly, the traditional intra-network beacon can have a specialized or unique data component that provides inter-network synchronization.

FIG. 4 illustrates the transmission of beacons from different NCCs on the same channel or on a single channel. In such a configuration a NCC can transmit both the standard or synchronization beacon (SB) transmission (intra-network communication control) and the channel or communication synchronization beacon (CSB) transmission or (inter-network transmission) in a single time slot or in adjacent time slots. Thus, each NCC's beacon or superframe can be communicated in a time-division manner or the beacons can be staggered in time.

Thus, a master NCC, transmitting on channel 1 402 can transmit inter-network synchronization data at the start of its superframe, the NCC on the same channel 1 404 can start its super frame at offset time 2, and the other NCC on the same channel 1 406 can start its super frame at offset time 3. Thus, each NCC can be assigned a different offset from the start of the master superframe and each NCC can start transmission of its superframe based on its assigned offset. Accordingly, a NCC such as NCC 404 can start it superframe with an intra-network and an inter-network synchronization beacon (i.e. the SB can include the CSB) at a predetermined offset time from the master beacon.

First SB 408 as transmitted by the master NCC can have an offset of one which can occur during the traditional intra-network beacon period. The second NCC 404 can have a superframe and/or CSB with an offset of two 410 and the third NCC 406 can have a superframe and/or a CSB with an offset of three. In such a configuration the traditional intra-network beacons of each NCC, denoted as 408, 412 and 414 can contain the information required to synchronize the networks.

Figure 5:
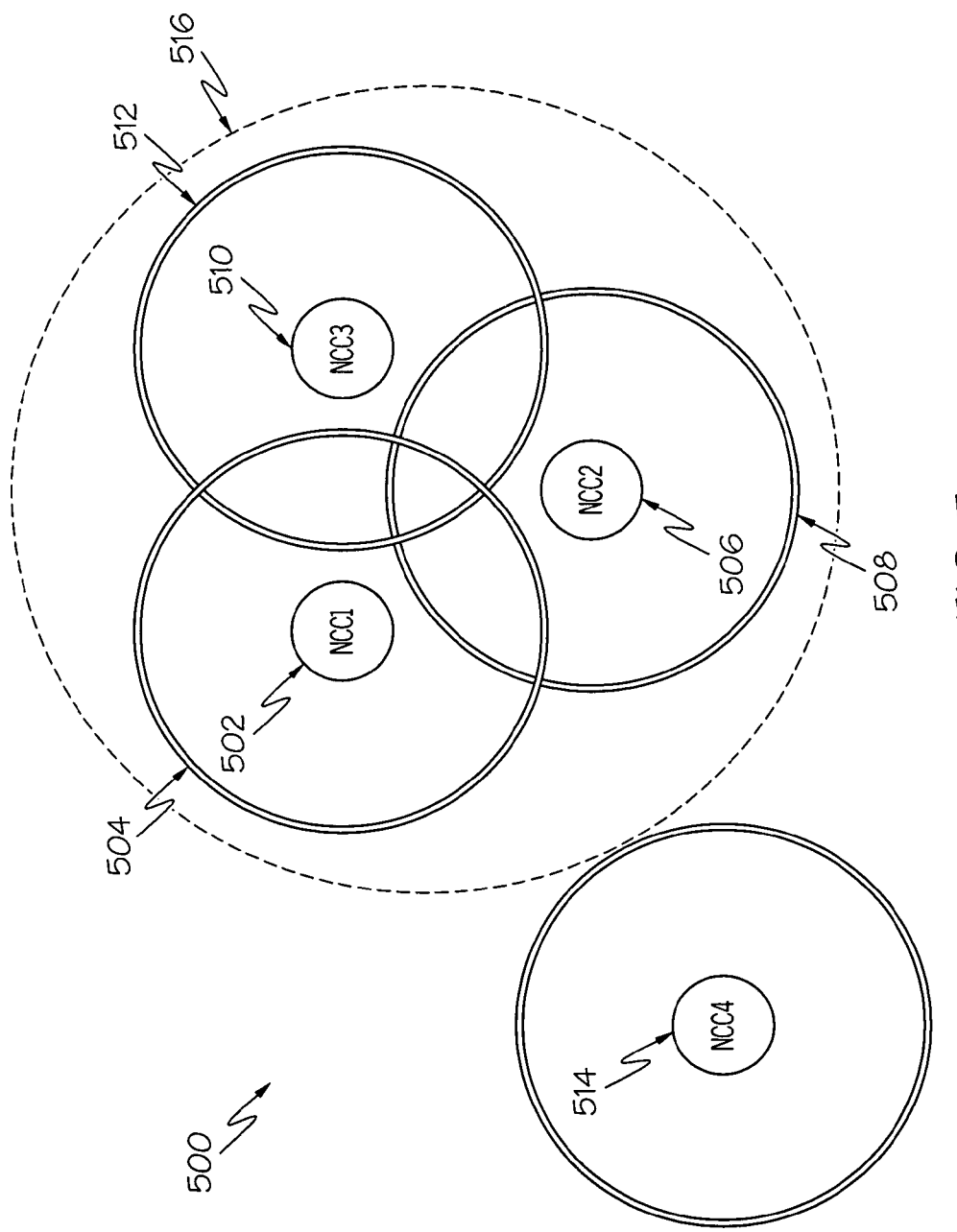
FIG. 5 is a radiation diagram for wireless networks in proximity to each other.

Referring to FIG. 5, a radiation diagram for wireless networks in proximity to each other that can form a synchronized area is depicted. For the description below it is assumed that each WN has the capacity to synchronize/channelize and desires to channelize to minimize interference from other WNs. The synchronized network 516 can include networks controlled by NCC 1 502, NCC 2 506, and NCC 3 510. The physical range or area that is covered by omni-directional transmissions from NCC 1 502 is illustrated generally by circle 504, the physical range or area that is covered by omni-directional transmissions from NCC 2 506 is illustrated generally by circle 508 and the physical range of omni-directional transmissions that is covered by NCC 3 510 is illustrated generally by circle 512.

A fourth wireless network controlled by NCC 4 is illustrated as having a radiation pattern that is not proximate to the synchronized area 516 and thus, NCC 4 would not be able to synchronize with the NCCs in the synchronized area. It could be stated that the network supported by NCC 4 514 is "outside" the range of synchronized area 516 and thus, may not interfere with network communications controlled by NCC 1 502, NCC 2 506, and NCC 3 510. Accordingly, NCC 4 514 may not need to synchronize with NCC 1 502, NCC 2 506 and NCC 3 510 because the distance between NCC 4 514 and the NCCs in the synchronized area can attenuate the narrowband signal that would typically interfere with network communications within the synchronized area 516.

As stated above, NCCs can scan channels until an M-NCC is located and if an M-NCC cannot be located, the NCC may decide to become an M-NCC. The scanning procedure attempts to prevent two neighbor NCCs from becoming M-NCCs. It can be appreciated that since beamforming is utilized, the vast majority of interfering scenarios will occur when NCCs receive beacons from numerous other NCCs.

In some embodiments, a multi-hop arrangement can take place when a NCC can scan channels, detect a predetermined number of NCCs but does not detect the presence of an M-NCC. Based on the number of CSB received, the NCC can determine if synchronization will improve performance of its network and all networks. Alternatively stated, if a NCC does not detect an M-CSB but detects a predetermined number of WNs with different CSB periods, the NCC can elect not to synchronize with other NCCs.

Such an arrangement can prevent an unlimited spread of the synchronization area or synchronization domain where too much bandwidth is assigned or allocated to WNS and little or no bandwidth is left for a NCC that want to form a network. The problems associate with the large spread of the synchronized domain is generally mitigated by beamforming and directional transmissions. Hence, the solution proposed here addresses the most critical scenarios or situations with very high network density As similarly described with reference to the above FIGs., it can be assumed that initially, no NCCs are operating in the synchronized area and all the narrowband and wideband channels are unoccupied or vacant. NCC 1 502 can monitor or scan each narrowband channel for a duration of time equal to the superframe size T in search of a NCC CSB.

If NCC 1 502, the first controller present in the synchronized area 516, performs a start up procedure and does not detect any CSBs, it can be concluded that NCC 1 502 is the first NCC to start operation in the synchronization area. After such a detection NCC 1 502 can start transmitting in a time slot designated as a master timeslot or first CSB timeslot (ID=a in FIG. 3) with an offset timing of one unit.

In the absence of CSB transmissions, NCC 1 502 can begin transmitting during a time slot reserved for an M-CSB and NCC 1 502 can operate as an M-NCC. Such an acquisition of the first allocated CSB time slot implies that NCC 1 502 will transmit a CSB with an offset of one on channel 1 for each superframe. NCC 1 502 can still transmit a traditional beacon for all network stations or devices associated with the M-NCC at the beginning of each superframe in addition to the M-CSB, where the M-CSB can have an offset 1 with respect to the start of the superframe.

In operation, NCC 1 506 can select one of the narrowband channels, say channel 1, to communicate data to the stations it services. The M-CSB can indicate allocated time intervals for all CSB offsets to be transmitted in the superframe. Assuming NCC 2 506 is the next NCC to power up in proximity to NCC 1 502, NCC 2 506 can follow a similar start up process as performed by NCC 1 502, only NCC 2 506 can detect that a master exists and NCC 2 506 can select the second time CSB time slot and the second channel for transmitting its CSB.

Thus, after receiving a traditional beacon NCC 2 506 can scan each narrowband channel for a superframe time duration, in search of CSBs. If the first channel monitored is channel 3, and no beacon is detected by NCC 2 506, NCC 2 506 can then move to monitor, say, channel 2 and scan again. If a CSB is not detected in channel 2, NCC 2 506 can scan channel 1 and so on. When monitoring channel 1, NCC 2 506 may detect the CSB originating from NCC 1 502.

From the data contained in the CSB received from NCC 1 502, NCC 2 506 can determine the CSB timing offsets, time allocations or time slots and NCC 2 506 can determine that the NCC transmitting on the first time allocation is NCC 1 502 and that NCC1 502 is an M-NCC. If no other CSB are detected while monitoring offset 2 and offset 3, NCC 2 506 can pick an unoccupied offset and a corresponding channel.

In some embodiments, NCC 2 506 can then select its own operating channel, say, channel 2, for communicating with devices in its network. To start its network on channel 2, NCC 2 506 can transmit its CSB. NCC 2 506 can estimate the time of the next SB transmission by NCC 1 502 and transmit its own beacon over channel 2 at that same time. This can allow NCC 2 506 to maintain synchronization with NCC 1 502.

NCC 2 506 can periodically switch channels and listen to transmissions on channel 1 and receive a CSB from NCC 1 502 to adjust for clock drift between networks across channels. Periodically monitoring other channels allows NCC 2 506 to maintain synchronization with NCC 1 502. These channel switches can take place within the superframe of NCC 2 506 but generally such channel switches should be avoided during the traditional beacon period.

Accordingly, NCC 3 510 can power up and follow the same procedure as NCC 2 506, except NCC 3 510 can detect the existence of both NCC 1 502 and NCC 2 506 and can select a different time slot. In addition, NCC 3 510 can also detect a media access control address associated with the master NCC (i.e. NCC 1 502). Based on the detection of NCC 1 502 and NCC 2 506, NCC 3 510 can decide to transmit its CSB with an offset of 3 as NCC 3 510 starts it network.

NCC 2 506 can also monitor NCC 1 502 on channel 1 periodically during offset time 1 to maintain synchronization. Monitoring of NCC 2 506 by NCC 1 502 may not be not required, but could be performed to provide additional data.

Due to factors such as mobility, power consumption and so on, the NCC 1 502 may have to leave the network. When this occurs, another NCC can establish itself as a master NCC in order to maintain the multichannel synchronization described. The selection of a new master NCC can be based on its MAC address. For example, the NCC with the lowest MAC address in its vicinity can become the new master NCC. In some embodiments, more than one NCC can be present depending on the network topology. The absence of a master NCC can be detected in many ways. In some embodiments, an exiting master NCC can announce that it will no longer function as a master sometime in the future. In some embodiments NCCs that are synchronized with the M-NCC can detect that there is no master NCC and can reconfigure transmissions in the synchronized area.

Such a determination can be made when the non-master NCCs stop receiving M-CSBs for a pre-defined consecutive number of superframes. In any case, when one or more M-NCCs are no longer transmitting a new/replacement M-NCC can be established. An M-NCC can utilize a localized procedure to replace an absent M-NCC in which a NCC with the CSB being transmitted in the second or adjacent CSB time slot can move to the first offset time slot and thus become the new M-NCC, or an NCC can stop sending the CSB in offset2 and start sending a CSB with an offset1.

Figure 6:
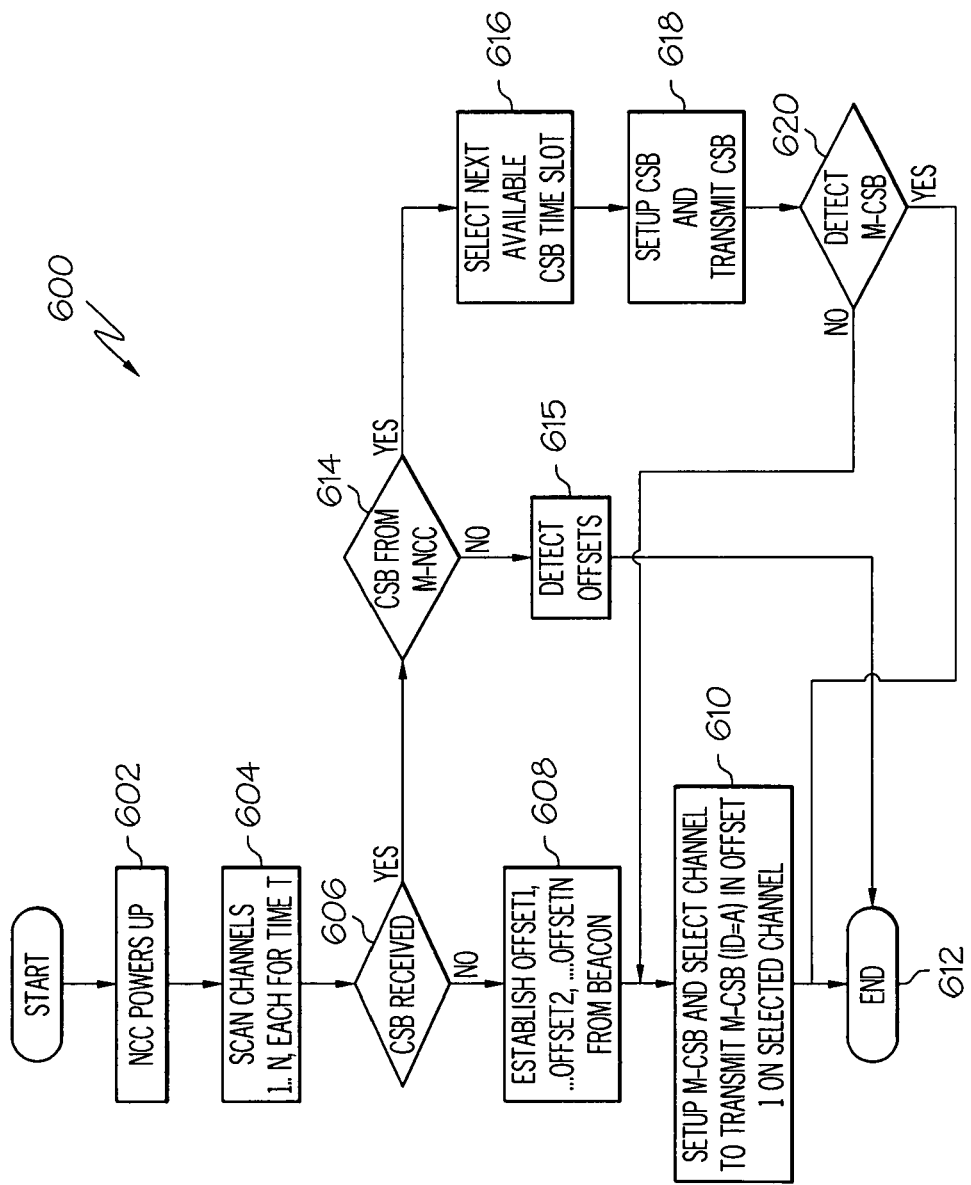
FIG. 6 is a flow diagram illustrating one arrangement for synchronizing networks.

Referring to FIG. 6, a flow diagram 600 of a method for synchronizing wireless networks such as piconets is illustrated. Such synchronization can be referred to as multichannel synchronization. As illustrated by block 602, a network controller can power up or enter a synchronized area. As illustrated by block 604, the NCC can scan channels for a CSB at different time intervals during a superframe. Such a scan for a CSB may be conducted in response to a main time sequencing beacon. As illustrated by decision block 606, the NCC can determine if one or more CSBs can be received. If no CSBs are received then a CSB offset or a set of CSB offsets can be established, as illustrated by block 608. The offset can be based on a time delay referenced from the main communication beacon. As illustrated in block 610 the CSB information can be set up and the NCC can transmit the CSB with the smallest offset. In addition, the NCC can select a channel for usage. The NCC can remain transmitting the CSB with the smallest offset and can occupy the channel it selects until the process ends.

If at decision block 606 one or more CSBs are received during a superframe, the NCC can determine if one of the CSB(s) is from an M-NCC, as illustrated by decision block 614. In some embodiments, the NCC can detect if an M-NCC exists by detecting a CSB transmission in the CSB timeslot with the smallest offset time. Hence, in some embodiments, failure to detect a CSB in the first CSB time slot can indicate that there is not a NCC acting as a master NCC in the synchronized area.

If at block 614 a CSB from an M-NCC cannot be detected, the NCC can detect communication parameter such as CSB offsets in the received CSB transmissions, as illustrated by block 615. Then, the NCC can set up to transmit master CSBs and transmit the M-CSBs in the offset one time slot on a particular channel, such as channel one as illustrated by block 610.

If at decision block 614 an M-CSB is received, then the NCC can select an unoccupied CSB time slot with the next available time offset, as illustrated by block 616. As illustrated by block 618, the NCC can set up a CSB and transmit the CSB during the selected timeslot.

As illustrated by decision block 620, the NCC can periodically monitor the M-CSB or the CSB occurring in the time slot with the smallest offset with the smallest timing offset and if the NCC cannot detect an M-NCC then the NCC can start transmitting a CSB in the first offset position, as illustrated by block 610. The process can end thereafter.

In some embodiments, the channelization can be set up and defined utilizing a wideband channel. After a first in time NCC carries out a startup up/synchronization procedure, the NCC can start utilizing a channel that provides better performance than "other" channels. Likewise, the NCCs that join later may test communication channels and determine that one channel performs better than other and then can utilize the "better" channels. In some embodiments, the NCC can enable the efficient usage of narrowband and wideband channels when a dense radio frequency environment is detected.

The disclosed arrangements can facilitate "spatial reuse" to a large extent, in a multichannel setting by making omnidirectional and directional transmissions separated in time. It can be appreciated that the disclosed arrangements can be employed in both centralized and distributed media access control (MAC) architectures.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In some embodiments, the methods disclosed can be implemented in software, which includes but is not limited to firmware, resident software, microcode, etc. Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

System components can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD). A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure, that the disclosure contemplates methods, systems, and media that can provide the above mentioned features. It is understood that the form of the embodiments shown and described in the detailed description and the drawings are to be taken merely as possible ways to build and utilize the disclosed teachings. It is intended that the following claims be interpreted broadly to embrace all the variations of the example embodiments disclosed.

What is claimed is:

1. A method comprising:
   receiving an inter-network transmission;
   monitoring the inter-network transmission to detect an inter-network synchronization parameter on a narrowband channel; and
   selecting an unoccupied wideband channel to conduct intra-network communications in response to detecting the inter-network synchronization parameter and based on the inter-network synchronization parameter;
   wherein detecting, by a sensor, multiple inter-network communication synchronization beacons and not detecting a master inter-network communication, does not trigger a transmission of a master inter-network communication synchronization beacon.

2. The method of claim 1 wherein monitoring comprises scanning narrowband channels to locate an unoccupied channel and acquiring usage of the unoccupied channel by transmitting an inter-network indicator of channel occupation.

3. The method of claim 2 wherein the unoccupied channel is a wideband channel and the indicator is transmitted on a narrowband channel.

4. The method of claim 2 wherein the selecting comprises selecting a narrowband channel to make narrowband inter-network transmissions and the selected narrowband channel has an associated wideband channel, the associated wideband channel utilized to make wideband intra-network transmissions.

5. The method of claim 1 further comprising determining that an active wideband channel contains a single active narrowband channel and utilizing time division to transmit multiple inter-network synchronization beacons on a single channel if the active wideband channel contains a single active narrowband channel.

6. The method of claim 1 wherein monitoring comprises determining if the received at least one intra-network transmission is a master intra-network transmission and selecting comprises utilizing data in the master intra-network transmission to select a wideband channel for intra-network transmissions.

7. The method of claim 1 wherein selecting comprises locating at least one wideband channel that is occupied, the wideband channel occupying a group of frequencies, and transmitting an intra-network communication synchronization beacon on a narrowband channel that does utilize frequencies in the occupied group of frequencies.

8. The method of claim 1 wherein selecting comprises locating at least one wideband channel that is occupied, the occupied wideband channel utilizing a group of frequencies, and responsive to the location transmitting inter-network communication on a narrowband channel utilizing frequencies that are outside the group of utilized frequencies for intra-network communications.

9. The method of claim 1 wherein the inter-network communications have a frequency range from thirty to seventy gigahertz.

10. An apparatus comprising:
a receiver to receive inter-network synchronization transmissions on one or more channels, the inter-network synchronization transmissions including at least one inter-network communication synchronization beacon;
a sensor to identify an unoccupied channel based on the inter-network communication synchronization beacon;
a trigger module to trigger a transmission of a second inter-network communication synchronization beacon, wherein the trigger module does not trigger transmission of a master inter-network communication beacon in response to the sensor detecting multiple inter-network communication synchronization beacons and not detecting a master inter-network communication; and
a transmitter to transmit the second inter-network communication synchronization beacon in response to the trigger.

11. The apparatus of claim 10 wherein the sensor is to identify an unoccupied channel based on information in the inter-network communication synchronization beacon.

12. The apparatus of claim 11 wherein the sensor is to utilize the inter-network communication synchronization beacon to acquire timing offset data related to the unoccupied channel.

13. The apparatus of claim 10 wherein the trigger module is to trigger a transmission of a master inter-network communication synchronization beacon if no master inter-network communication synchronization beacon transmission is detected.

14. The apparatus of claim 10 wherein the transmitter is to transmit data on a wideband channel in response to no master inter-network communication synchronization beacon transmission being detected.

15. The apparatus of claim 10 wherein the trigger module is to trigger data transmissions on a predetermined wideband channel in response to the reception of the inter-network communication synchronization beacon.

16. A computer program product including a computer readable storage medium, wherein the computer readable storage medium does not comprise a transitory signal, the computer readable storage medium including instructions that, when executed by a processor, cause the computer to:
receive at least one inter-network transmission;
monitor the received inter-network transmission to detect a parameter of the at least one inter-network communication synchronization beacon on a narrowband channel; and
select an unoccupied channel to conduct communications in response to detection of the parameter and based on the parameter;
wherein detection, by a sensor, of multiple inter-network communication synchronization beacons and no detection of a master inter-network communication, does not trigger transmission of a master inter-network communication synchronization beacon.

17. The computer program product of claim 16, that when executed by a processor causes the computer to scan narrowband channels to locate an unoccupied channel and to acquire usage of the unoccupied channel by transmitting an indicator of acquired usage of the unoccupied channel.

18. The computer program product of claim 16, that when executed by a processor causes the computer to determine that the unoccupied channel is a wideband channel and causes the computer to transmit the indicator on a narrowband channel.

19. The computer program product of claim 16, that when executed by a processor causes the computer to select a narrowband channel, to create a narrowband intra-network transmission, to select a narrowband channel that has an associated wideband channel and to make at least one wideband intra-network transmission.

* * * * *